United States Patent
Hirano et al.

(10) Patent No.: US 7,306,775 B2
(45) Date of Patent: Dec. 11, 2007

(54) METHOD FOR REMOVING HALOGEN SERIES GAS

(75) Inventors: Hachiro Hirano, Tokyo (JP); Hisakazu Arima, Fukuoka (JP); Yoichi Mori, Kumamoto (JP)

(73) Assignee: Asahi Glass Company, Limited, Tokyo (JP)

( * ) Notice: Subject to any disclaimer, the term of this patent is extended or adjusted under 35 U.S.C. 154(b) by 593 days.

(21) Appl. No.: 10/821,899

(22) Filed: Apr. 12, 2004

(65) Prior Publication Data

US 2004/0258596 A1 Dec. 23, 2004

Related U.S. Application Data

(63) Continuation of application No. PCT/JP02/10614, filed on Oct. 11, 2002.

(30) Foreign Application Priority Data

Oct. 12, 2001 (JP) .............................. 2001-315405

(51) Int. Cl.
*B01D 53/68* (2006.01)
*B01J 20/20* (2006.01)

(52) U.S. Cl. ............................. 423/240 S; 423/245.1; 502/184; 502/237; 95/131; 95/132

(58) Field of Classification Search ............ 423/240 S, 423/241, 245.1, 245.3; 502/184, 237; 95/131, 95/132
See application file for complete search history.

(56) References Cited

U.S. PATENT DOCUMENTS 3,658,724 A * 4/1972 Stiles .................. 502/183
4,215,096 A * 7/1980 Sinha et al. .................. 423/241
4,673,558 A * 6/1987 Senoue et al. .......... 423/240 R
4,855,276 A * 8/1989 Osborne et al. ............. 502/415
5,670,445 A * 9/1997 Kitahara et al. ............. 502/406
5,817,284 A * 10/1998 Nakano et al. .......... 423/240 S
6,146,606 A 11/2000 Atobe et al. .............. 423/239.1
6,325,841 B1 * 12/2001 Otsuka et al. .................. 95/132
6,352,653 B1 * 3/2002 Hirano et al. ................ 252/189
6,649,082 B2 * 11/2003 Hayasaka et al. .......... 252/79.1
6,685,901 B2 2/2004 Hirano et al. ............. 423/240 S

FOREIGN PATENT DOCUMENTS

| CN | 1372488 A | 5/2001 |
|---|---|---|
| EP | 1 063 001 | 12/2000 |
| JP | 61-61619 | 3/1986 |
| JP | 62-42727 | 2/1987 |
| JP | 62-121621 | 6/1987 |
| JP | 4-187211 | 7/1992 |
| JP | 10-277363 | 10/1998 |
| JP | 2002-143640 | 5/2002 |
| WO | WO 01/89666 A1 | 11/2001 |

OTHER PUBLICATIONS

Patent Abstracts of Japan, JP 04-305245, Oct. 28, 1992.

* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

A method for removing a halogen series gas, which comprises contacting a gas containing a halogen series gas forming at least one kind selected from the group consisting of HF, HCl, HBr and HI by water with a granule containing from 60 to 99.9 mass % of a solid base and from 0.1 to 40 mass % of a carbonaceous material to the total mass amount of the granule in the presence of water.

10 Claims, No Drawings

METHOD FOR REMOVING HALOGEN SERIES GAS

TECHNICAL FIELD

The present invention relates to a method for removing a halogen series gas (hereinafter referred to as "present halogen series gas") forming HF (hydrogen fluoride), HCl (hydrogen chloride), HBr (hydrogen bromide) or HI (hydrogen iodide) by reaction with water, such as a dry etching exhaust gas, a CVD (chemical vapor phase deposition) chamber exhaust gas, an ion implantation exhaust gas or a doping exhaust gas, formed in a production process of a semiconductor.

BACKGROUND ART

A dry etching exhaust gas containing a present halogen series gas, a CVD chamber exhaust gas containing an $SiH_4$ (silane) gas as the main component, and an implantation or doping exhaust gas containing $AsH_3$ (arsine) or $PH_3$ (phosphine) as the main component, contain the above-mentioned main component gases together with a carrier gas such as $N_2$ (nitrogen) gas, and the present halogen series gas or particles formed by decomposition or reaction of these materials in a production apparatus.

Heretofore, as a method for treating a present halogen series gas, a method classified as a thermal decomposition method, an adsorption method or a wet type absorption method has been employed. The thermal decomposition method decomposes a gas to be treated by heating or combustion in a combustion type exhaust gas-treating apparatus, the adsorption method is a dry type treating method having an activated carbon or zeolite packed as an adsorbent, and the wet type absorption method is a wet type treating method absorbing the present halogen series gas with a water, an alkaline solution such as sodium hydroxide aqueous solution or an oxidation-reduction aqueous solution.

Among them, a dry type treating method using an activated carbon adsorbent as a packing material has been frequently used in order to make an apparatus smaller or to simplify operation and maintenance of the apparatus. However, there have been various problems such as a danger of fire by heat of adsorption of a gas to be treated, degradation of working environment at the time of exchanging a packing due to an odor of the present halogen series gas desorbed from an adsorbent used, and treatment of a solid waste. Also, it has been demanded to further increase an adsorption capacity of a packing in order to reduce times of exchanging operations of the packing. These problems were remarkable particularly at the time of removing a $Cl_2$ gas or a mixture gas of $Cl_2$ and $BCl_3$ (boron trichloride), which has been frequently used.

In addition to the above methods for removing the present halogen series gas, there is a method of employing a chemical reaction, the treating capacity by which is expected to be improved. For example, there is disclosed a method of using a granule such as magnesium oxide (MgO) or sodium hydrogencarbonate ($NaHCO_3$) (JP-A-61-61619, JP-A-62-42727 and JP-A-2002-143640). However, in order to practically work the above disclosed method, it is demanded to improve capacity at the time of treating the present halogen series gas which is rarefied and at a high linear velocity, and it is required to achieve improvement on a reaction rate for a long life by an inexpensive, safe and convenient method. Also, in a semiconductor equipment, several kinds of gases are used for one apparatus, and it is therefore demanded to remove various present halogen series gases by one removing agent. Further, according to a method including an adsorption method by an activated carbon, it was difficult to predict the end of reaction, and therefore it was usually confirmed by checking discoloration of an indicator reagent at the outlet of a packed bed after the fact. Further, its life was estimated by measuring a weight increase of a packed bed, but it was difficult to effect accurate estimation since the weight changes after the reaction depending on the composition of a gas to be treated.

In order to solve the above-mentioned problems, the present invention provides a method of removing a present halogen series gas, which enables to enhance a performance of treating the present halogen series gas, to prevent firing of the adsorbent, to reduce an odor of the adsorbent used and generation of a solid waste, and to make estimation of the life of a removing agent easy, thereby improving a semiconductor production process.

DISCLOSURE OF THE INVENTION

In order to solve these problems, the present inventors have provided a method for removing a halogen series gas, which comprises contacting a gas containing a halogen series gas forming at least one kind selected from the group consisting of HF, HCl, HBr and HI by water with a granulated material (hereinafter referred to as "present granule") containing from 60 to 99.9 mass % of a solid base and from 0.1 to 40 mass % of a carbonaceous material to the total mass amount of the present granule in the presence of water.

In the present invention, it is possible to largely increase a treating capacity of removing a present halogen series gas not by adsorption but by using a solid base as a base material for carrying out a neutralization reaction which enables a higher treating capacity, and an acid gas such as HF, HCl, HBr or HI formed from the present halogen series gas can be stably and efficiently removed from a gas to be treated without adding a new apparatus, a packing or a metal. In the removing method employing a neutralization reaction (hereinafter referred to as "neutralization reaction method"), when using simply a solid base, the neutralization reaction is inhibited by formation of a hypohalogenite and consequently a treating capacity is lowered in such a case that the present halogen series gas is $Cl_2$, $Br_2$ and $I_2$. In order to solve this problem, several methods of adding an acid gas to a gas to be treated or adding a heavy metal have been proposed in the technical scope of the neutralization reaction method disclosed heretofore (US2002/0068032A1). As compared with these newly disclosed methods, the present invention can easily and inexpensively remove accumulation of the hypohalogenite by one removing agent without adjusting the composition of a gas to be treated, without adding other packed bed and without employing a metal which is expensive or is hardly disposed.

Further, without providing new equipment or a packing, it is possible to have water present necessary for forming an acid gas such as HF, HCl, HBr or HI from a present halogen series gas. Thus, it has been newly discovered that the above problem can be solved by selecting a solid base such as sodium hydrogencarbonate or potassium hydrogencarbonate which form water by neutralization of the granule. Also, it has been discovered that the life of the granule can be monitored by observation of discoloration by effectively carrying out consumption of an activated carbon to be used.

On the other hand, the present granule alone can be applied to the treatment of the present halogen series gas forming at least one kind selected from the group consisting of HF (hydrogen fluoride), HCl (hydrogen chloride) and HBr (hydrogen bromide) by hydrolyzing $SiF_4$ (silicon tetrafluoride), $SiH_2Cl_2$ (dichlorosilane), $SiCl_4$ (silicon tetrachloride), $AsCl_3$ (arsenic trichloride), $PCl_3$ (phosphorus trichloride), $BF_3$ (boron trifluoride), $BCl_3$, $BBr_3$ (boron tribromide), $WF_6$ (tungsten hexafluoride), $ClF_3$ (chlorine trifluoride), $COF_2$ (carbonyl fluoride) or the like. In addition, $COCl_2$ (phosgene) hydrolyzable by water can be removed although a removing performance is lowered as compared with the above illustrated gases.

It has been discovered that the treatment of the hydrolyzable present halogen series gas can be carried out by selecting a solid base forming water by neutralization as a solid base for the present granule without providing new equipment for a packing. Also, the present granule becomes an efficient removing agent by accelerating hydrolysis by the function of a pore volume and a specific surface area of an activated carbon contained therein. Also, the removal of the present halogen series gas by the present granule can be efficiently carried out by the neutralization reaction of the solid base with an acid gas such as HF, HCl, HBr or HI, and the removal can be effectively carried out even in the presence of an acid gas such as HF, HCl, HBr or HI as compared with the removal carried out by adsorption with an activated carbon.

Further, the present granule provides a merit of enhancing a treating capacity since the present granule has a high bulk density and can be packed into a column of a removing apparatus at a high packing mass amount. An activated carbon conventionally used has a packing density of from 0.4 to 0.6 $g/cm^3$, while the present granule has a packing density of at least 0.7 $g/cm^3$, preferably at least 0.8 $g/cm^3$, more preferably at least 0.9 $g/cm^3$. Since the present granule has a higher packing density per unit volume, an amount of treating the present halogen series gas becomes large.

It is preferable for preventing powdering of a packed bed to adjust a hardness of the present granule in such a manner that particles of a particle diameter of from 1.0 mm to less than 1.5 mm have an average hardness of at least 0.5 N, or particles of a particle diameter of from 1.5 mm to less than 2.0 mm have an average hardness of at least 1 N, or particles of a particle diameter of at least 2.0 mm have an average hardness of at least 5 N.

When preparing a packed bed of the present granule in a removing apparatus in a semiconductor production process, in order to improve a removing performance of the present halogen series gas, an amount of granules having a particle diameter of at most 4 mm is adjusted to at least 90 mass % and an amount of granules having a particle diameter of at most 1.0 mm is adjusted to at most 10 mass %, thereby making a structure of the packed bed uniform and consequently achieving a higher removing performance.

By combining the above-mentioned new features of the present invention, a remarkably excellent method for removing a present halogen series gas and a treating agent for removing the present halogen series gas can be provided, which solve conventionally difficult or high cost various problems and enable prolongation of life, low cost, compacting of equipment, diversion of previous equipment, easiness of maintenance and treatment of a byproduct after removal, safety by reducing heat generation due to heat of adsorption, easiness of predicting the life of a removing agent and the like by only one agent. The present invention largely contributes to improvement in production of a semiconductor by maintaining a high operation efficiency of equipment and enhancing a capacity of semiconductor production equipment necessary for using various gases.

Also, the present granule may be used in combination with other removing reagents. For example, a granule comprising an activated carbon or sodium hydrogencarbonate may be used by packing into a column of a removing apparatus as a mixture and/or separate layers. For example, when hydrogen chloride is a major component of the present halogen series gas, it is preferable to arrange a packed bed of granules of sodium hydrogencarbonate in the upstream of the present halogen series gas and arranging a packed bed of the present granule in the downstream.

BEST MODE FOR CARRYING OUT THE INVENTION

The present invention removes a present halogen series gas, i.e. a halogen series gas forming HF, HCl, HBr or HI by water, such as a dry etching exhaust gas, a CVD chamber exhaust gas, an ion implantation exhaust gas or a doping exhaust gas generated in a semiconductor production process. More concretely, a gas to be treated by the present granule may contain a halogen series gas other than the present halogen series gas.

In the present invention, the preset halogen series gas preferably has a temperature of from 0° C. to 100° C. for efficiently carrying out removing treatment. If the present halogen series gas has a temperature of lower than 0° C., the reaction rate of the present granule and the present halogen series gas becomes unpreferably low. Also, if the present halogen series gas has a temperature of at most 100° C., it is not necessary to prepare equipment of a packed column or the like with an expensive heat resistant material or structure, thus enabling simplification of operation and equipment.

In the present invention, one kind selected from the group consisting of a hydrogencarbonate, a carbonate, an oxide and a hydroxide of an alkali metal or an alkali earth metal can be used as a solid base. Examples of the hydrogencarbonate include sodium hydrogencarbonate or potassium hydrogencarbonate, and examples of the carbonate include sodium carbonate, sodium sesquicarbonate, potassium carbonate or basic magnesium carbonate (magnesium hydroxycarbonate), and examples of the oxide include magnesium oxide or calcium oxide, and examples of the hydroxide include sodium hydroxide, potassium hydroxide, calcium hydroxide or magnesium hydroxide. Examples of other solid bases include sodium silicate, soda-lime, sodium tripolyphosphate or sodium citrate. Sodium carbonate or sodium sesquicarbonate may be any of natural or synthetic one, and a sodium carbonate is usable regardless of light (light ash) or heavy (dense ash).

Among the hydrogencarbonates, sodium hydrogencarbonate is particularly preferably since it has no moisture-absorbing property, and is suitable for preparing a granule, and is easily stored, and is easily available in a large amount at a low cost, thus being suitable as a raw material for industrial production on the other hand, when it is not preferable to use a sodium salt, $KHCO_3$ (potassium hydrogencarbonate) is preferably used.

A content of a carbonaceous material in the present granule is preferably from 0.1 to 40 mass %. If the content of the carbonaceous material in the present granule is less than 0.1 mass %, it is not preferable since the following effect of containing a carbonaceous material can not be achieved, and if the content of a carbonaceous material exceeds 40 mass %, a hardness (compression strength) of the present granule is unpreferably lowered and becomes fragile. It is particularly preferable that the content of a carbonaceous material in the present granule is from 0.1 to 20 mass %.

In the present invention, when the present halogen series gas is a halogen series gas containing at least one kind selected from the group consisting of $Cl_2$, $Br_2$ and $I_2$, by having a carbonaceous material contained in the present granule, reactivity of a solid base and a halogen in the presence of water is improved, and it is usable for a larger amount of the halogen series gas even when using the same amount of a solid base. This mechanism is explained below.

In the present invention, it is considered that the reaction of a solid base and a halogen element is accelerated by reacting a carbonaceous material in the present granule with water and at least one halogen element selected from the group consisting of $Cl_2$, $Br_2$ and $I_2$. Hereinafter, the estimated reaction mechanism is explained by using $Cl_2$ as a halogen and sodium hydrogencarbonate as a solid base.

A carbonaceous material in the present granule is reacted with $Cl_2$ in the presence of water to produce hydrogen chloride (HCl) (Formula 1). On the other hand, when sodium hydrogencarbonate ($NaHCO_3$) is reacted with $Cl_2$, it is considered that sodium hypochlorite (NaClO) and sodium chloride (NaCl) are formed in accordance with Formula 2. At this time, in order to make the reaction proceed to the right side in Formula 2, it is necessary to reduce an amount of sodium hypochlorite on the right side as small as possible, and it is therefore necessary to successively decompose the sodium hypochlorite formed. Thus, the present inventors estimate that the decomposition of sodium hypochlorite is a factor for controlling the total reaction as a rate-determining reaction. It is considered that the hydrogen chloride formed in Formula 1 accelerates the decomposition of sodium hypochlorite on the right side in Formula 2 (Formula 3).

$$Cl_2+H_2O+C \rightarrow 2HCl+CO \qquad \text{Formula 1}$$

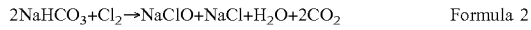
$$2NaHCO_3+Cl_2 \rightarrow NaClO+NaCl+H_2O+2CO_2 \qquad \text{Formula 2}$$

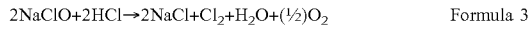
$$2NaClO+2HCl \rightarrow 2NaCl+Cl_2+H_2O+(\tfrac{1}{2})O_2 \qquad \text{Formula 3}$$

The decomposition of sodium hypochlorite is carried out also as illustrated in Formula 4 (spontaneous decomposition) and Formula 5 (side-reaction of spontaneous decomposition), and HClO formed in the halfway is also decomposed under acid condition (Formula 6). The present inventors estimate that $Cl_2$ is removed mainly as illustrated in Formula 7. Also, when a halogen is $Br_2$ or $I_2$, a hypohalogenite is formed in the same manner as above, and it is considered that the decomposition of hydrogen halide is accelerated.

$$NaClO \rightarrow NaCl \rightarrow O \qquad \text{Formula 4}$$

$$3NaClO \rightarrow NaClO_3+2NaCl \qquad \text{Formula 5}$$

$$HClO \rightarrow HCl+(\tfrac{1}{2})O_2 \qquad \text{Formula 6}$$

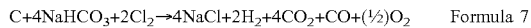
$$C+4NaHCO_3+2Cl_2 \rightarrow 4NaCl+2H_2+4CO_2+CO+(\tfrac{1}{2})O_2 \qquad \text{Formula 7}$$

Also, since HCl is reacted with $NaHCO_3$ (Formula 8), a halogen series gas forming at least one kind selected from the group consisting of HF, HCl and HBr can be removed by an acid gas such as HF, HCl or HBr and/or a water content. Further, since hydrogen chloride decomposing sodium hypochlorite formed in Formula 1 is consumed in Formula 8, the present granule can be more preferably used when the present halogen series gas is an acid gas such as HF, HCl or HBr and/or a mixture gas of a halogen series gas forming at least one kind selected from the group consisting of HF, HCl and HBr by water.

$$NaHCO_3+HCl \rightarrow NaCl+CO_2+H_2O \qquad \text{Formula 8}$$

When the reaction of Formula 1 is initiated, water is necessary, but it is sufficient for this purpose to use a small amount of water in air incorporated in the gas to be treated and water deposited on the present granule. Thereafter, water is provided as a reaction product of the present granule (Formula 2 and Formula 3).

Examples of the carbonaceous material used in the present invention include activated carbon, charcoal, bone black, graphite, carbon black, cokes, coal, fullerene, carbon nanotube, carbon microcoil, glass-like carbon and the like.

An activated carbon is particularly preferable as the carbonaceous material. In the present invention, the activated carbon is not limited depending on a difference in a raw material, an activating method, impregnation, presence or absence of a carried material, and the like, and any kinds of activated carbon can be used in the present invention. Also, an activated carbon having an alkali or a metal oxide impregnated, an activated carbon having a catalyst such as palladium carried, or an activated carbon having a water content impregnated, can be used in the present invention without any essential problem.

When the carbonaceous material is an activated carbon, a pore structure of the present granule can be optimumly adjusted, and reactivity of the present granule can be improved. It is preferable that an activated carbon used in the present granule has an average pore radius of from 0.1 to 50 nm and a pore volume of from 0.1 to 4 $cm^3/g$. When the average pore radius and the pore volume of activated carbon are smaller than the above-mentioned values, the present halogen series gas hardly penetrates into a deep part of the present granule, such being unpreferable. On the other hand, when the average pore radius and the pore volume are larger than the above-mentioned values, a mechanical strength of the present granule is lowered and pores are easily collapsed at the time of molding, such being unpreferable. Thus, it is particularly preferable that the activated carbon has an average pore radius of from 0.2 to 50 nm and a pore volume of from 0.1 to 3 $cm^3/g$.

In the present specification, an average pore radius is a pore radius (nm) at the point when an accumulated pore volume becomes 50%, which is determined by measuring a pore volume by nitrogen gas adsorption method using a gas adsorption pore distribution analyzer and determining an accumulation curve when the total pore volume is made 100%.

The present granule can contain from 0.1 to 10 mass % of a porous material comprising an inorganic oxide (hereinafter simply referred to as "porous material").

By blending the porous material with the present granule, the present halogen series gas and a hydrogen halide gas formed in accordance with the above reaction formula are introduced into the inside of the present granule, and can be reacted with a solid base in the whole inside of the present granule. When a content of the porous material is less than 0.1 mass %, it is not preferable since its effect is not sufficiently achieved, and when the content exceed 10 mass %, it is not preferable since a hardness of the present granule is lowered.

Thus, it is preferable that the porous material has an average pore radius of from, 0.1 to 50 nm and a pore volume of from 0.05 to 4 $cm^3/g$. The porous material has the present halogen series gas and a hydrogen halide gas formed in accordance with the above reaction formula introduced into a deep part of the present granule, and increases a specific surface area of the present granule to be reacted. In this manner, a reaction rate and a reaction efficiency of the reaction of a solid base in the present granule with the present halogen series gas and a hydrogen halide gas formed in accordance with the above reaction formula are improved. If the average pore radius and the pore volume of the porous material are smaller than the above-mentioned values, gas diffusion becomes insufficient and a reaction rate and a reaction efficiency are lowered, such being unpreferable. On the other hand, if the average pore radius and the pore volume are larger than the above values, a hardness of the present granule is lowered and is easily powdered, such being unpreferable. Thus, it is particularly preferable that the porous material has an average pore radius of from 0.2 to 50 nm, and a pore volume of from 0.1 to 3 cm$^3$/g.

It is preferable to blend clay with the present granule since the clay has a layer structure which provides gaps within the present granule and introduce a gas into the inside of the present granule in the same manner as the porous material.

It is not preferable if a content of the clay is less than 0.1 mass % since its aimed effect is not achieved, and it is also not preferable if a content of the clay exceeds 10 mass % since a hardness of the present granule is lowered. When employing a porous material and clay in combination, its total amount is preferably at most 10 mass %.

A ratio of a solid base and a porous material or clay in the present granule is optimized depending on composition, concentration, pressure, temperature, treating time and other conditions of a halogen series gas to be treated. When the concentration, pressure and temperature of the present halogen series gas are low, and when a contact time between the present granule and the present halogen series gas is short, it is preferable to increase a content of a porous material.

Examples of the porous material include natural or synthetic zeolite, silica gel, alumina, porous glass, diatomaceous earth, porous ceramics and the like. Also, examples of the clay such as activated clay, acid clay, pearlite, layer silicate i.e. chrysotile or bentonite, an acid-treated product of sepiolite, palygorskite, allophane, imogolite or an acid treatment produce of antigorite, and a synthetic layer compound. Silica gel and natural or synthetic zeolite are particularly preferable as the porous material, and activated clay and bentonite are particularly preferable as the clay since they are industrially easily available at a low cost.

In the present invention, it is preferable that primary particles of a solid base and a carbonaceous material have a mean particle diameter of from 1 to 500 μm. When using a porous material and a clay, it is preferable that their primary particles have a mean particle diameter of from 1 to 500 μm. If the mean particle diameter of primary particles is less than 1 μm, it is not preferable since a satisfactory fluidity can not be obtained and their handling becomes difficult. On the other hand, if the mean particle diameter of primary particles exceeds 500 μm, it is not preferable since uniform mixing of a solid base, a carbonaceous material, a porous material and a clay in the granule becomes difficult and industrial production of the granule becomes difficult, thereby requiring a high cost. The primary particle means single crystal of a solid base, particle of a carbonaceous material, particle of a porous material and particle of a clay.

In the present invention, with regard to powder or granule having a mean particle diameter of at least 70 μm, the term "mean particle diameter" means a particle diameter at the point of 50% of an accumulated mass determined by measuring a mass amount remaining on each sieve and the lowest bottom tray in accordance with sieve analysis and preparing an accumulation curve by taking the total mass amount as 100%. On the other hand, with regard to a mean particle diameter of less than 70 μm, the term "mean particle diameter" means a particle diameter at the point of 50% of an accumulated volume determined by measuring by an apparatus of measuring a laser diffraction scattering type particle diameter distribution measuring apparatus and preparing an accumulation curve by taking the total volume as 100%.

It is preferable that the mean particle diameter of the present granule is from 0.5 to 20 mm. In this manner, without introducing new equipment, it is possible to use packed type equipment conventionally used for activated carbon and zeolite as it is. If the average particle diameter of the present granule is less than 0.5 mm, it is not preferable since a pressure loss caused by passing the present halogen series gas to be treated through a packed bed of the present granule becomes high and consequently additional aspirating equipment such as a vacuum pump must be employed or a required power of the equipment must be increased. On the other hand, if the mean particle diameter exceeds 20 mm, it is not preferable since a contact surface area between the present halogen series gas and the external surface of the present granule is lowered and a performance of removing the present halogen series gas by the present granule is lowered. Thus, it is particularly preferable that the present granule has a mean particle diameter of from 0.5 to 10 mm. Also, when preparing a packed bed of a removing apparatus in a semiconductor production process, it is preferable to employ at least 90 mass % of granules having a particle diameter of at most 4 mm and at most 10 mass % of granules having a particle diameter of at most 1.0 mm in order to improve a performance of removing the present halogen series gas, thereby providing a packed bed having a uniform structure and achieving a higher removing performance. This is because the number of theoretical plates is increased when the structure of the packed bed becomes uniform. When the amount of granules having a particle diameter of at most 4 mm is at most 90 mass %, the packed structure of the packed bed does not become uniform and the present halogen series gas hardly penetrates into the inside of larger particles and consequently the reaction rate of the present granule is lowered. On the other hand, when the amount of granules having a particle diameter of at most 1.0 mm is at least 10 mass %, the smaller granules enter into gaps of other granules, and the packed structure of the packed bed does not become uniform and consequently the reaction rate of the present granule is lowered since a uniform gas stream can hardly be formed.

In the present invention, a content of a solid base in the present granule is from 60 to 99.9 mass %. If the content is less than 60 mass %, a capacity of treating the present halogen series gas is unpreferably lowered.

A binder may be mixed with the present granule. The binder may be optionally selected from well known binder i.e. sodium silicate, CMC (carboxymethyl cellulose) or PVA (polyvinyl alcohol) depending on the composition of the present halogen series gas.

The amount of the binder mixed is preferably from 0.01 to 10 mass % to the total mass amount of the present granule. If the amount of the binder mixed is less than 0.01 mass %, an effect of improving a hardness by the binder can not be expected and it becomes meaningless to use the binder. On the other hand, if the amount of the binder mixed exceeds 10 mass %, an amount of a solid base is unpreferably lowered.

It is preferable to employ a solid base and a carbonaceous material in a total amount of at least 80 mass % in the present granule. If the total amount of a solid base and a carbonaceous material in the present granule is less than 80%, it is not preferable since a capacity of treating gas by the halogen series gas-removing agent is lowered and the removing agent-packed bed must be more frequently replaced. Thus, it is particularly preferable to employ a solid base and a carbonaceous material in a total amount of at least 85 mass %.

The present granule can be obtained by any of a dry method or a wet method. Examples of a granulating method include a compression-molding method, a rolling granulating method, a agitating granulating method, an extrusion molding method, a spray drying method, a fluidized bed method, and the like. A dry type compression-molding method such as a tableting method or a roll press method is preferable since it is favorable for industrial production because it requires no drying step and can simplify the process, it can produce a present granule having a high hardness without a binder, it can increase a total amount of a solid base and a carbonaceous material, and there is no fear of lowering a strength of the present granule due to degradation of a binder by the present halogen series gas. In this case, as a method of adjusting a particle diameter distribution and a mean particle diameter of the present granule, a process of granulation by a dry compression-molding machine, roughly pulverizing and sieving can be employed. Also, other methods for obtaining the present granule include a method comprising kneading a solid base, a carbonaceous material, if necessary, a porous material, a water-soluble binder such as CMC and water, forming by a wet type extrusion type molding machine such as a pelletizer, and then drying and sieving to adjust a particle diameter distribution and an average particle diameter. Also, after molding by a pelletizer, pellets may be rounded into spheres by a rolling granulating machine such as a rounder, thereby preventing occurrence of an abraded part of the present granule (such as a protruded part easily falling off from the present granule) and raising a density when they are packed into a packed bed. This can be achieved also by repeating sieving operations several times. It is preferable to carry out a plurality of sieving operations since they can narrow a particle diameter distribution of the present granule and can produce a uniformly packed structure of a packed bed, thereby improving the number of theoretical plates of the packed bed and further improving a capacity of treating the present halogen series gas.

A hardness is used for evaluating a strength of the present granule. The "hardness" is a force required to compress and crush one granule by applying a vertical force thereto from the upper position. Since the hardness varies depending on a granule size even if the same material is employed, it is necessary to measure the hardness after adjusting granules, for example, by sieving. When the present granule has an average granule diameter of from 0.5 to 20 mm, each granule is classified from 0.5 mm to gradually larger sizes 0.5 mm by 0.5 mm by sieving. For example, with regard to granules having a mean granule diameter of from 1.5 mm to less than 2.0 mm, the granules are classified by using a sieve having an opening of 1.5 mm and a sieve having an opening of 2.0 mm to collect 20 pieces of granules remained on the sieve of 1.5 mm and passed through the sieve of 2.0 mm, and a hardness of each granule is measured and their average value is employed as an evaluation standard of a granule strength.

It is preferable that the present granule has an average hardness of at least 0.1 N in case of granules having a granule diameter of from 0.5 mm to less than 1.0 mm, or an average hardness of at least 0.5 N in case of granules having a granule diameter of from 1.0 mm to less than 1.5 mm, or an average hardness of at least 1 N in case of granules having a granule diameter of from 1.5 mm to less than 2.0 mm, or an average hardness of at least 5 N in case of granules having a granule diameter of at least 2.0 mm. It is particularly preferable that the present granule comprises granules having hardness values not lower than the above respective average hardness values in the above whole granule diameter ranges.

When the present granule is used as a packed bed, it is preferable to use granules having such a high hardness as to prevent removing operation from a trouble of powdering caused at the time of packing or reacting due to a low hardness, thus avoiding deposition in tubes, occlusion, absorption by a vacuum pump or enlarged pressure loss caused when a gas to be treated passes through the packed bed.

When a solid base in the present granule is sodium hydrogencarbonate or potassium hydrogencarbonate, it is water-soluble and most of reaction products with the present halogen series gas are also water-soluble salts. When water-soluble salts are formed, most of them other than a carbonaceous material and a porous material are dissolved in water after removing the present halogen series gas, and an amount of a solid waste can be largely reduced, such being preferable. Also, when the granule is dissolved in water, the carbonaceous material and the porous material can be recovered by filtration, and can be reused for recycling, if necessary.

Since a solid base in the present granule forms a non-volatile salt by reacting with a halogen alone or a halide compound, a halogen odor is not generated by desorption of a halogen alone or a halide compound at the time of exchanging a packing as in the case of removing operation by adsorbing with an activated carbon alone. Thus, since the working environment at the time of exchanging the packing is remarkably improved, working safety of an operator is satisfactory and removing equipment placed in a working place can be made smaller. Also, when the solid base is a hydrogencarbonate, the hydrogencarbonate has a fire-extinguishing property as sodium hydrogencarbonate is used as a fire-extinguishing agent, and since neutralization reaction of a hydrogencarbonate is generally an endothermic reaction, it provides a remarkable merit as there is no risk of firing in comparison with an adsorption operation with an activated carbon. Also, since an activated carbon contained in the present granule is effectively consumed, the present granule is discolored in accordance with progress of reaction with the present halogen series gas and the outer appearance of the present granule is discolored from black to white, gray or brown. The color phase varies depending on a gas to be treated, but there is a large merit of being able to estimate a life by the change of the outer appearance color. Particularly, when it is used as a packed bed, the discolored part extends gradually from the upper stream of the present halogen series gas to the lower stream, and it is therefore quite easy to estimate the life of the packed bed as compared with the method of removing the present halogen series gas by using a conventional packing. This is also a feature which can not be provided by a conventional agent for removing the present halogen series gas, and it is possible to conveniently administer a packed bed of equipment of removing the present halogen series gas in a semiconductor production process at a high reliability.

Also, the present granule can be used not only for removing a halogen series gas in dry etching, CVD exhaust gas and other various processes but also can be satisfactorily used for an absorbing tube of a gas mask.

EXAMPLES

In the present Examples, a hardness was measured by using Kiya system digital hardness meter KHT-20 type manufactured by Fujiwara Scientific Company Co., Ltd. Also, since the hardness varies depending on a particle diameter, particles to be measured were adjusted so as to have same particle diameters by sieving.

With regard to an average particle diameter, a mean particle diameter of less than 70 μm was measured by using Microtrack FRA9220 manufactured by Nikkiso Co., Ltd., and an average particle diameter of at least 70 μm was measured by sieving. Also, a mean particle radius and a pore volume were measured by an automatic surface area-measuring apparatus (tradename: Sorptmatic 1990) manufactured by AMCO Incorporated.

Example 1

A molded product of a mixture of an activated carbon and flake-like sodium hydrogencarbonate was obtained by uniformly mixing 10 kg of sodium hydrogencarbonate powder for a food additive (manufactured by Asahi Glass Company, Limited) having a mean particle diameter of 95 μm of primary particles, with 300 g of an activated carbon (tradename: activated carbon Shirasagi C manufactured by Takeda Chemical Industries, Ltd.) having a mean particle diameter of 43 μm, a mean pore radius of 1.25 nm and a pore volume of 0.63 $cm^3/g$, and composition-molding the resultant mixture by a roll press type compression-molding machine (tradename: roller compactor WP type, roll outer diameter: 230 mm, roll length: 80 mm, manufactured by TURBO KOGYO CO., LTD.) at a linear pressure of 36.8 kN/cm.

The flake-like molded product thus obtained was pulverized by a roll type pulverizing-granulating machine (tradename: pulverizing roll granulator GRN-2521 type manufactured by NIPPON GRANULATOR CO.,LTD.) to obtain granules. The pulverizing machine comprised two steps, and the first step at a rotating blade pitch of 14 mm and the second step of 4 mm. Thereafter, the granules thus obtained were subjected to sieving with a stainless standard sieve having an inner diameter of 200 mm and having two sets of sieves having an opening of 1.0 mm and an opening of 2.8 mm, and 1 kg of present granules remained on the sieve of 1.0 mm and passed through the sieve of 2.8 mm was obtained.

Thereafter, 100 g of the granules was placed on a set of stainless steel standard sieves having an inner diameter of 200 mm and having openings of 5.60 mm, 4.75 mm, 4.00 mm, 2.80 mm, 2.00 mm and 1.00 mm respectively overlaid and a bottom tray was placed on the lowest bottom. The granules was then shaped by a low tap shaker type sieve-shaking machine (tradename: IIDA SHIEVE SHAKER manufactured by IIDA SEISAKUSYO., shaking number: 290 rotations/minute, hitting number: 165 times/minute) for 10 minutes, and a mean particle diameter was determined to be a particle diameter having an accumulated passing mass amount of 50% by measuring a remaining mass amount on each sieve and the bottom tray and graphing an accumulated passing mass amount to each opening. The present granule thus measured had a mean particle diameter of 2.3 mm. Granules having a particle diameter of at most 4 mm was 100 mass %, and granules having a particle diameter of at most 1.0 mm was 19.9 mass %.

A hardness of the granule was measured in accordance with the above-mentioned hardness-measuring method. Thus, the above obtained granules having a mean particle diameter of 2.3 mm was sieved with sieves having openings of respectively 0.5 mm, 1.0 mm, 1.5 mm, 2.0 mm and 2.5 mm, and 20 pieces of granules having each particle diameter were measured with regard to a hardness to determine an average value. As this result, an average hardness of granules of 0.5 to 1.0 mm was 0.6 N, an average hardness of granules of 1.0 to 1.5 mm was 4 N, an average hardness of granules of 1.5 to 2.0 mm was 9 N, and an average hardness of granules of at least 2.0 mm was 18 N.

Thereafter, 500 g of the above obtained granule was packed into a glass-made reactor having an internal diameter of 51 mm and a length of 600 mm and having an air permeable glass plate at the bottom. A packed height was 292 mm, a packed volume was 596 $cm^3$, and a packed density was 0.84 $g/cm^3$. A gas comprising 20 vol % of $Cl_2$ and 80 vol % of $N_2$ was charged through the bottom at a temperature of 25° C. under normal pressure at a flow amount of 250 $cm^3$/minute at a standard state (0° C., 0.10 MPa).

A concentration of the gas thus treated was measured by using a diaphragm electrode type chlorine gas-detector manufactured by Denki Kagaku Keiki Kabushiki Kaisha. The detecting range is from 0 to 3 volume ppm, and the detecting lower limit is 0.01 volume ppm, and a gas concentration change can be continuously and numerically measured. $Cl_2$ was at most 0.01 volume ppm immediately after initiating the gas treatment.

The $Cl_2$ concentration in the treated gas rised after 506 minutes from the initiation of treatment, and the chlorine gas-detector worked. The packing was taken out and checked, and it was observed that the granule was not powdered and a chlorine odor was not substantially generated. Also, when the packing was dissolved in water, components other than the activated carbon were dissolved, and an amount of a solid waste could be reduced by subjecting to filtration-separation. Also, when a temperature of the packed bed during treating the mixed gas was measured, a maximum temperature of the outer part of the glass wall of the packed bed was 37° C. and a minimum temperature thereof was 22° C., and these values were much lower as compared with the following Comparative Examples. The temperature was highest in the lower gas stream side and lowest in the upper gas stream side. Also, the places of the maximum temperature and the minimum temperature moved to the lower gas stream side in accordance with the progress of the reaction. This tendency was common also in the following Examples. Further, a concentration of carbon monoxide in the treated gas was measured by a gas-detecting tube (tradename: carbon monoxide gas-detecting tube No. 1L manufactured by GASTEC CORPORATION, detecting range per 100 ml of absorbed amount: 2.5-2,0.00 volume ppm), and a carbon monoxide concentration at the time of absorbing 100 ml of gas was 200 volume ppm. This result proves that the reaction of the above-mentioned formula 1 was caused. Also, a temperature in the outside of the apparatus was 25 to 26° C. in the Examples up to Example 7.

Further, in accordance with the progress of the reaction, the present granule was discolored gradually from black to brown from the upper gas stream side of the gas to be treated, and when this coloration reached 3 cm from the lower stream, the gas detector worked and the end of reaction could be visually confirmed. This means that the end of reaction of the present granule can be visually estimated.

Example 2

The same test as in Example 1 was carried out, except that 500 g of A type zeolite (Nihon Builder K.K.) having a mean particle diameter of 2 μm, an average pore radius of 0.2 nm and a pore volume of 0.45 $cm^3/g$ was added in the production of granules in Example 1. An average particle diameter of the present granule was 2.2 mm. A granular product having a particle diameter of at most 4 mm was 100 mass %, and a granular product having a particle diameter of at most 1.0 mm w as 19.1 mass %. A packed height was 288 mm, a packed volume was 588 $cm^3$ and a packed density was 0.85 g/cm. A particle strength of the granule was measured in the same manner as in Example 1, and an average hardness of granules of 0.5 to 1.0 mm was 1 N, an average hardness of granules of 1.0 to 1.5 mm was 9 N, an average hardness of granules of 1.5 to 2.0 mm was 14 N, and an average hardness of granules of at least 2.0 mm was 24 N. When a flown gas was analyzed in the same manner as in Example 1, a chlorine gas detector did not work and a $Cl_2$ concentration was at most 0.01 volume After a lapse of 546 minutes from the initiation of operation, a $Cl_2$ concentration in the treated gas began to rise. The packing was taken out and checked, and it was recognized that granules were not powdered and a chlorine odor was not generated. Also, when the packing was dissolved in water, components other than the activated carbon and the zeolite were dissolved, and an amount of a solid waste could be reduced by being subjected to filtration-separation. Further, when a temperature of the packed bed during treating the mixed gas was measured, a maximum temperature was 34° C. and a minimum temperature was 22°.

In accordance with the progress of the reaction, the present granule was discolored gradually to brown from the upper stream side of the gas to be treated, and when the discoloration reached 2 cm from the lower stream, the gas detector worked and the end of the reaction could be visually estimated.

Example 3

The same test as in Example 2 was carried out, except that an Na type bentonite having an average particle diameter of 17 μm (tradename: Kunigel V1 manufactured by Kunimine Industries Co., Ltd.) was used in place of A type zeolite in Example 2. A mean particle diameter of the present granule was 2.4 mm. A granular product having a particle diameter of at most 4 mm was 100 mass %, and a granular product having a particle diameter of at most 1.0 mm was 16.1 mass %. A packed height was 289 mm, a packed volume was 590 $cm^3$ and a packed density was 0.85 $g/cm^3$. A particle strength of the granule was measured in the same manner as in Example 1, and an average hardness of granules of 0.5 to 1.0 mm was 0.4 N, an average hardness of granules of 1.0 to 1.5 mm was 4 N, an average hardness of granules of 1.5 to 2.0 mm was 13 N, and an average hardness of granules of at least 2.0 mm was 18 N. When a flown gas was analyzed in the same manner as in Example 1, a chlorine gas detector did not work and a C12 concentration was at most 0.01 volume ppm.

After a lapse of 512 minutes from the initiation of operation, a $Cl_2$ concentration in the treated gas began to rise. The packing was taken out and checked, but powdering of granules was not recognized and a chlorine odor was not generated. Also, when the packing was dissolved in water, components other than the activated carbon and the bentonite were dissolved, and an amount of a solid waste could be reduced by being subjected to filtration-separation. Also, when a temperature of the packed bed during treating the mixed gas was measured, a maximum temperature was 36° C. and a minimum temperature was 23° C.

Further, in accordance with the progress of the reaction, the present granule was discolored gradually to brown from the upper stream side of the gas to be treated, and when the discoloration reached 2 cm from the lower stream, the gas detector worked and the end of the reaction could be visually estimated.

Example 4 (Comparative Example)

The same test as in Example 1 was carried out except that the granule was changed to be sodium hydrogencarbonate alone in Example 1. The present granule had a mean particle diameter of 2.1 mm. A granular product having a particle diameter of at most 4 mm was 100 mass %, and a granular product having a particle diameter of at most 1.0 mm was 21.1 mass %. A packed height was 260 mm, a packed volume was 531 $cm^3$ and a packed density was 0.94 $g/cm^3$. When a flown gas was analyzed in the same manner as in Example 1, a chlorine gas detector did not work, and a $Cl_2$ concentration was at most 0.01 volume ppm.

After a lapse of 5 minutes from the initiation of operation, a $Cl_2$ concentration in the treated gas rised, and the chlorine gas detector worked. When the packing was taken out and checked, powdering of granules was not recognized, and a chlorine odor was stronger than Example 1 but much weaker than the following Example 5. Also, when the packing was dissolved in water, all of components were dissolved. When a temperature of the packed bed during treating the mixed gas was measured, a maximum temperature was 25° C. and a minimum temperature was 20° C.

Further, the outer appearance of these granules remained white, and the end of reaction could not be confirmed from the outer appearance color, and the life of the granules could not be visually estimated.

Example 5 (Comparative Example)

The same test as in Example 1 was carried out, except that impregnated charcoal (tradename: particulate Shirasagi XRC manufactured by Takeda Chemical Industries, Ltd.) was used in place of the granule of Example 1. The granule had a mean particle diameter of 1.4 mm, and granules having a particle diameter of at most 4 mm was 100 mass %, and granules having a particle diameter of at most 1.0 mm was 10.3 mass %. A packed height was 381 mm, a packed volume was 778 $cm^3$ and a packed density was 0.64 g/cm3. When the treated gas was analyzed, a chlorine gas detector did not work and a $Cl_2$ concentration was at most 0.01 volume ppm.

After a lapse of 380 minutes from the initiation of treatment, a $Cl_2$ concentration in the treated gas began to rise, and the chlorine gas detector worked. When the packing was taken out and checked, powdering of granules was not recognized, but a remarkable chlorine odor was recognized. The packing was not dissolved in water. Also, when a temperature of the packed bed during treating the mixed gas was measured, a maximum temperature was 73° C. and a remarkable heat-generation was recognized. A minimum temperature was 25° C.

Further, the outer appearance of this activated carbon remained black, and the end of reaction could not be confirmed from the outer appearance color, and the life of the activated carbon could not be visually estimated.

Example 6

The same test as in Example 1 was carried out, except that a gas having a composition of $BCl_3$ 5.0 vol %, $CCl_4$ 0.6 vol %, $Cl_2$ 10.0 vol %, $SiCl_4$ 0.6 vol %, HCl 4.8 vol %, $COCl_2$ 0.6 vol %, $F_2$ 2.7 vol %, $COF_2$ 0.6 vol %, HF 4.8 vol %, $SiF_4$ 0.6 vol %, $NF_3$ 0.8 vol %, HBr 4.8 vol %, $WF_6$ 0.6 vol %, $ClF_3$ 0.6 vol % and $N_2$ 62.9 vol % was charged from the bottom at a temperature of 25° C. under normal pressure at a flow amount of 250 cm$^3$ per minute at a standard state (0° C., 0.10 MPa) in place of the gas of Example 1. The granule was the same as that used in Example 1. The packed height was 295 mm, the packed volume was 602 cm$^3$, and the packed density was 0.83 g/cm$^3$.

When the treated gas was analyzed, a chlorine detector did not work and a $Cl_2$ concentration was at most 0.01 volume ppm, and $BCl_3$, $CCl_4$, $SiCl_4$, HCl, $COCl_2$, $F_2$, $COF_2$, HF, $SiF_4$, $NF_3$, HBr, $WF_6$, $ClF_3$ other than nitrogen were analyzed by a gas chromatograph mass analyzer (manufactured by Perkin Elmer Japan Co., Ltd., gas chromatograph portion: autosystem XL, mass analysis portion: turbomass), but any of these components could not be detected.

After a lapse of 271 minutes from the initiation of treatment, a $Cl_2$ concentration in the gas began to rise, and a chlorine gas detector worked. When the packing was taken out and checked, powdering of granules was not recognized, and a chlorine odor was not generated. Also, when the packing was dissolved in water, components other than the activated carbon was almost dissolved, and an amount of a solid waste could be reduced by being subjected to filtration-separation. Also, when a temperature of the packed bed during treating the mixed gas was measured, a maximum temperature was 44° C. and a minimum temperature was 22° C.

In accordance with the progress of the reaction, the present granule discolored gradually to gray from the upper stream side of the gas to be treated, and when the discoloration reached 2 cm from the lower stream, the gas detector worked and the end of reaction could be visually estimated.

Example 7 (Comparative Example)

The same test as in Example 6 was carried out, except that impregnated charcoal (tradename: particulate Shirasagi XRC manufactured by Takeda Chemical Industries, Ltd.) was used in place of the granule of Example 6. The impregnated charcoal was the same as that employed in Comparative Example 5. A packed height was 383 mm, a packed volume was 782 cm$^3$, and a packed density was 0.64 g/cm$^3$. When the treated gas was analyzed, a chlorine gas detector did not work and a $Cl_2$ concentration was at most 0.01 volume ppm. When $BCl_3$, $CCl_4$, $SiCl_4$, HCl, $COCl_2$, $F_2$, $COF_2$, HF, $SiF_4$, $NF_3$, HBr, $WF_6$ and $ClF_3$ other than nitrogen were analyzed by a gas chromatograph mass analyzer in the same manner as in Example 6, any of these components could not be detected.

After a lapse of 175 minutes from the initiation of treatment, a $Cl_2$ concentration in the treated gas began to rise, and the chlorine gas detector worked. When the packing was taken out and checked, powdering of the granules was not recognized, but a remarkable chlorine odor was recognized. Also, the packing was not dissolved in water. Further, when a temperature of the packed bed during treating the mixed gas was measured, a maximum temperature was 76° C. and a minimum temperature was 25° C.

Further, the outer appearance of the present granule remained black, and the life could not be estimated from the outer appearance color.

Example 8

A granule was prepared by pulverizing with a pulverizer in the same manner as in Example 1, except that 9.5 kg of sodium hydrogencarbonate and 500 g of activated carbon were mixed. Thereafter, the granule thus prepared was sieved by a stainless steel standard sieve having an inner diameter of 200 nm and comprising two sieves having respectively 1.7 mm and 4.0 mm openings by hand to collect granules between the 1.7 mm sieve and the 4.0 mm sieve (granules remained on the 1.7 mm sieve). The granule thus obtained had a mean particle diameter of 2.0 mm. A granulated product having a particle diameter of at most 4 mm was 96.1 mass % and a granulated product having a particle diameter of at most 1.0 mm was 11.5 mass %. In this manner, 2 kg of the present granule was prepared.

A particle strength of the granule was measured in the same manner as in the above hardness-measuring method. Thus, the obtained granules was sieved by sieves having respectively 0.5 mm, 1.0 mm, 1.5 mm, 2.0 mm and 2.8 mm openings, and 20 pieces of granules having each particle diameter were measured to determine an average hardness value. Since the sieve having an opening of 4.0 mm was used for measurement of these granules, a maximum particle diameter in this Example became larger than Example 1 and therefore the sieve having an opening of 2.8 mm was additionally used. An average hardness of granules of 0.5 to 1.0 mm was 1 N, an average hardness of granules of 1.0 to 1.5 mm was 5 N, an average hardness of granules of 1.5 to 2.0 mm was 16 N, an average hardness of granules of 2.0 to 2.8 mm was 37 N, and an average hardness of granules of at least 2.8 mm was 54 N.

Thereafter, the above granulated product was packed to a height of 200 mm in a glass-made reactor tube having an inner diameter of 30 mm and a length of 300 mm and having an air-permeable glass plate at a bottom. A packed volume was 141 cm$^3$. A packed mass amount was 154.6 g. A packed density was 1.09 g/cm$^3$. The reason why the constant volume of packing was used, is that a constant volume of column is used in an apparatus for removing an etching exhaust gas or the like in actual semiconductor production, and a value at a constant volume becomes a life of an actual removing agent column, and it is therefore necessary to collect a performance comparative data at a constant volume. A gas having a composition of $Cl_2$ 2.4 vol %, $BCl_3$ 0.6 vol % and $N_2$ 97.0 vol % was charged from the bottom at a temperature of 25° C. under normal pressure at a flow amount of 424 cm$^3$ per minute at a standard state (0° C., 0.10 MPa). In order to observe a concentration of the treated gas, a glass container having a litmus test paper was placed at the gas outlet of the packed glass-made reactor tube.

After a lapse of 300 minutes from the initiation of treatment, the litmus test paper was discolored by the granule. When the packing was taken out and checked, powdering of the granule was not recognized and a chlorine odor was not substantially generated. When the packing was dissolved in water, components other than the activated carbon were dissolved, and the amount of a solid waste could be reduced by being subjected to filtration-separation.

Also, when a temperature in the center of the packed bed during treating the mixed gas was measured at the outside of the glass wall of the packed bed, a temperature before operation was 16° C. and a maximum temperature was 46° C. which was much lower than 60° C. of the following Comparative Example 10.

Also, the present granule was black, but was discolored gradually to light gray color from the upper stream side of the gas to be treated in accordance with the progress of the reaction, and when the discoloration reached 3 cm from the lower stream, the litmus test paper was discolored, and the end of reaction could be visually estimated from the discoloration of the granule.

Example 9

The same procedure as in Example 8 was repeated as a production method of a present granule to obtain 2.0 kg of granules between a sieve of 1.7 mm and a sieve of 4.0 mm (granules remained on the 1.7 mm sieve). The granules thus obtained was sieved again by hand with two sieves having respectively 1.7 mm and 4.0 mm openings to collect granules between the 1.7 mm sieve and the 4.0 mm sieve (granules remained on the 1.7 mm sieve). The object of this operation is to remove fragile granules by sieving two times and to remove protruded parts on the surfaces of granules, thereby preventing generation of powder. The present granule had a mean particle diameter of 2.6 mm. A granulated product having a particle diameter of at most 4 mm was 98.9 mass % and a granulated product having a particle diameter of at most 1.0 mm was 1.6 mass %. In this manner, 1.5 kg of a granule was produced. A particle strength of the granule thus produced was measured in the same manner as in Example 8. As this result, an average hardness of granules of 0.5 to 1.0 mm was 3 N, an average hardness of granules of 1.0 to 1.5 mm was 10 N, an average hardness of granules of 1.5 to 2.0 mm was 17 N, an average hardness of granules of 2.0 to 2.8 mm was 28 N, and an average hardness of granules of at least 2.8 mm was 92 N. The above obtained granule of this Example was packed to a height of 200 mm as a packing in a glass-made reactor tube having an inner diameter of 30 mm and a length of 300 mm and having an air-permeable glass plate at the bottom. A packed mass amount was 148.5 g. A packed density was 1.05 g/cm$^3$. The present halogen series gas was flown under the same conditions as in Example 8. In order to observe a concentration of the treated gas, the glass container having a litmus test paper was placed at the gas outlet of the packed glass-made reactor tube in the same manner as in Example 8.

After a lapse of 349 minutes from the initiation of treatment, the litmus test paper was discolored by the present granule. When the packing was taken out and checked, powdering of the granules was not recognized and a chlorine odor was not substantially generated. Also, when this packing was dissolved in water, components other than the activated carbon were dissolved, and an amount of a solid waste was reduced by being subjected to filtration-separation.

Also, when a temperature in the center of the packed bed during treating the mixed gas was measured at the outside of the glass wall of the packed bed, a temperature before operation was 16° C. and a maximum temperature was 48° C. which was much lower than 60° C. of the following Comparative Example 10.

Further, the present granule was black, but was discolored gradually to light gray color from the upper stream side of the gas to be treated in accordance with the progress of the reaction, and when the discoloration reached 1 cm from the lower stream, the litmus test paper was discolored, and the end of reaction was visually estimated from the discoloration of the granule. As this result, it was proved that Example 9 was more superior to Example 8. The present inventors consider that this is because the present granule had a narrower particle diameter distribution due to sieving operations carried out two times, and consequently the uniformity of the packed bed was enhanced, and the number of theoretical plates was increased since the present halogen series gas is more uniformly flown through the packed bed.

Example 10 (Comparative Example )

The same test as in Example 8 was carried out, except that impregnated charcoal (tradename: particulate Shirasagi XRC manufactured by Takeda Chemical Industries, Ltd.) was used in place of the granule of Example 8. The impregnated charcoal was the same as that used in Comparative Example 5. The granule thus obtained was packed to a height of 200 mm, and a packed mass amount was 84.7 g. A packed density was 0.600 g/cm$^3$. After a lapse of 190 minutes from the initiation of treatment, a litmus test paper was discolored by the granule. Also, when a temperature in the center of the packed bed during treating the mixed gas was measured at the outside of the glass wall of the packed bed, a temperature was 16° C. before the operation and a maximum temperature was 60° C. which was high.

When the packing was taken out and checked, powdering of the granules was not recognized but a remarkable chlorine odor was recognized. Also, the packing was not dissolved in water.

Further, the outer appearance of the activated carbon remained substantially black, and the end of reaction of granules could not be clearly recognized from the outer appearance color, and the life of the activated carbon could not be visually estimated.

INDUSTRIAL APPLICABILITY

According to the present invention, a granule usable as an agent for removing a halogen alone or a halide compound can be obtained, and the present granule is not powdered at the time of using, achieves a high removing performance, does not produce an odor, does not cause heat generation and enables easy recognition of the end of reaction. Also, the granule of the present invention is applicable as it is to a packing column using a conventional activated carbon.

The entire disclosure of Japanese Patent Application No. 2001-315405 filed on Oct. 12, 2001 including specification, claims and summary is incorporated herein by reference in its entirety.

What is claimed is:

1. A method for removing a halogen series gas, which comprises contacting a gas containing a halogen series gas with a granule in the presence of water, wherein the granule comprises from 60 to 99.9 mass % of a solid base and from 0.1 to 40 mass % of a carbonaceous material to the total mass amount of the granule, the halogen series gas enters into a reaction with water to form at least one kind selected from the group consisting of HF, HCl, HBr and HI, and wherein the solid base is sodium hydrogencarbonate and/or potassium hydrogencarbonate, and the granule contains from 0.1 to 10 mass % of a porous material, wherein the porous material is silica gel and/or zeolite having an average pore radius of from 0.1 to 50 nm and a pore volume of from 0.05 to 4 cm³/g.

2. The method for removing a halogen series gas according to claim 1, wherein the halogen series gas is at least one kind selected from the group consisting of $Cl_2$, $Br_2$ and $I_2$.

3. The method for removing a halogen series gas according to claim 1, wherein the carbonaceous material is an activated carbon having an average pore radius of from 0.1 to 50 nm and a pore volume of from 0.05 to 4 cm³/g.

4. The method for removing a halogen series gas according to claim 1, wherein the granule contains from 0.1 to 10 mass % of clay.

5. The method for removing a halogen series gas according to claim 1, wherein the granule has a packed density of at least 0.7 g/cm³.

6. The method for removing a halogen series gas according to claim 1, wherein the granule comprises granules of a particle diameter of from 1.0 mm to less than 1.5 mm having an average hardness of at least 0.5 N, or granules of a particle diameter of from 1.5 mm to less than 2.0 mm having an average hardness of at least 1 N, or granules of a particle diameter of at least 2.0 mm having an average hardness of at least 5 N.

7. The method for removing a halogen series gas according to claim 1, wherein the granule contains granules having a particle diameter of at most 1.0 mm in an amount of at most 10 mass %.

8. A method for producing a semiconductor by removing a halogen series gas by the method for removing a halogen series gas as defined in claim 1.

9. An agent for removing a halogen series gas, in the form of a granule, and comprising from 60 to 99.9 mass % of a solid base and from 0.1 to 40 mass % of a carbonaceous material to the total mass amount of the granule, wherein the solid base is sodium hydrogencarbonate and/or potassium hydrogencarbonate, and the granule contains from 0.1 to 10 mass % of a porous material. wherein the porous material is silica gel and/or zeolite having an average pore radius of from 0.1 to 50 nm and a pore volume of from 0.05 to 4 cm³/g.

10. The method for removing a halogen series gas according to claim 1, which additionally comprises stopping said method after the granule becomes discolored.

* * * * *